UNITED STATES PATENT OFFICE.

ALBERT BAUR, OF MÜLHAUSEN, GERMANY, ASSIGNOR TO THE FABRIQUES DES PRODUITS CHIMIQUES DE THANN ET DE MULHOUSE, OF THANN AND MÜLHAUSEN, GERMANY.

ARTIFICIAL MUSK.

SPECIFICATION forming part of Letters Patent No. 560,771, dated May 26, 1896.

Application filed September 9, 1895. Serial No. 561,992. (No specimens.)

*To all whom it may concern:*

Be it known that I, ALBERT BAUR, a citizen of the Swiss Republic, residing at Mülhausen, (Alsace,) Germany, have found new and useful Improvements in the Manufacture of Artificial Musk, of which the following is a specification.

My process relies upon the following reactions: To ten parts of butylxylene I add two parts of chlorid of acetyl and about one part of chlorid of aluminium, and I heat gently a few hours on the water-bath. I afterward pour the product of reaction into water, separate the oil, and after having dried the product of reaction separated from oil I submit it to fractional distillation. The fraction boiling from 250° to 270° centigrade contains, mainly, the butylxylylmethylketone, which is formed according to the following equation:

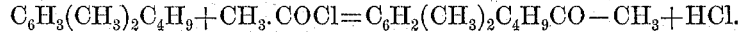

$$C_6H_3(CH_3)_2C_4H_9 + CH_3.COCl = C_6H_2(CH_3)_2C_4H_9CO - CH_3 + HCl.$$

In a state of perfect purity this body boils at 265° centigrade and melts at 48° centigrade. One part of the ketone is slowly introduced into about ten parts of concentrated nitric acid of ninety-eight to one hundred per cent., the mixture being kept thoroughly cool. After a few hours the liquid is poured into water, and the crystalline mass is filtered, washed with water and carbonate of soda, and crystallized out of alcohol or any other suitable solvent.

The new body is a dinitrobutylxylylmethylketone and has the formula:

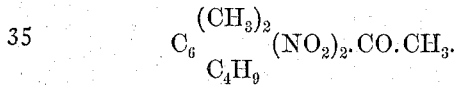

It forms white needles, insoluble in water, soluble in alcohol, ether, and other organic solvents, and possesses a strong musk-like odor. Its melting-point is 137° centigrade. Bodies of the same odoriferous properties are obtained when acting on butylxylene with chlorid of propionyl, butyryl, or other chlorid of acids of the fatty series, and nitrating the homologeous ketones thus obtained.

I am well aware that Dr. Albert Baur, of Gispersleben, Germany, (not the present applicant,) who has taken out the American Patent No. 451,847, dated May 5, 1891, has discovered that one butylic group, one or two other alcoholic groups, and three nitro groups must be present in an aromatic hydrocarburet in order to produce musk-like smelling substances. By stating that one of these three nitro groups may be substituted by a ketone group, as $CH_3CO$, $C_3H_7.CO$, &c., without altering the odor, I have only completed Baur's invention formerly referred to.

Having now particularly described my invention and the manner in which the same is to be carried out, what I claim is—

1. The process for producing musk-like smelling substances by treating butylxylene in the presence of chlorid of aluminium with homologous fatty chlorids such as acetyl chlorid and nitrating the ketone thus obtained, as described.

2. As a new article of manufacture, the artificial musk herein described, having a musk-like odor constituting a dinitro derivative of a butylxylylalkyl ketone and presenting itself in the shape of a substance crystallizing in white needles, insoluble in water, soluble in organic solvents such as alcohol and ether.

In witness whereof I have hereunto signed my name in the presence of two subscribing witnesses.

ALBERT BAUR.

Witnesses:
GEORGE GIFFORD,
AMAND RITTER.